United States Patent
Francis

(10) Patent No.: US 10,930,422 B2
(45) Date of Patent: Feb. 23, 2021

(54) POWER ELECTRONICS DEVICE WITH IMPROVED ISOLATION PERFORMANCE

(71) Applicant: Murata Manufacturing Co., Ltd., Nagaokakyo (JP)

(72) Inventor: Lee Francis, Milton Keynes (GB)

(73) Assignee: MURATA MANUFACTURING CO., LTD., Kyoto (JP)

(*) Notice: Subject to any disclaimer, the term of this patent is extended or adjusted under 35 U.S.C. 154(b) by 569 days.

(21) Appl. No.: 15/498,769

(22) Filed: Apr. 27, 2017

(65) Prior Publication Data

US 2017/0316863 A1    Nov. 2, 2017

(30) Foreign Application Priority Data

Apr. 28, 2016  (GB) .................................. 1607433.8

(51) Int. Cl.
*H01F 27/06* (2006.01)
*H01F 27/28* (2006.01)
(Continued)

(52) U.S. Cl.
CPC .............. *H01F 27/06* (2013.01); *H01F 27/24* (2013.01); *H01F 27/28* (2013.01);
(Continued)

(58) Field of Classification Search
CPC ............ H01F 27/2804; H01F 17/0006; H01F 41/041; H01F 27/022; H01F 27/2895; H01F 27/266
(Continued)

(56) References Cited

U.S. PATENT DOCUMENTS 5,070,317 A     12/1991  Bhagat
5,804,952 A  *   9/1998  Chen ..................... H02M 3/28
                                                        323/255
(Continued)

FOREIGN PATENT DOCUMENTS

EP      0 809 263 A1    11/1997
GB      2531353 A        4/2016
JP      61-19109 A       1/1986

OTHER PUBLICATIONS

Kneller et al., "DC-DC Converter Device", U.S. Appl. No. 15/703,086, filed Sep. 13, 2017.
(Continued)

*Primary Examiner* — Elvin G Enad
*Assistant Examiner* — Joselito S. Baisa
(74) *Attorney, Agent, or Firm* — Keating & Bennett, LLP

(57) ABSTRACT

A power electronics device includes one or more electrical windings included in an insulating substrate. A cavity and a channel connected to the cavity are also included in the insulating substrate, and a magnetic core is located in the cavity. The device also includes primary and secondary side electrical components located on first and second regions of a principal surface of the insulating substrate. An isolation region is located on the principal surface of the insulating substrate between the first and second regions, and the channel extends from the cavity to a first channel opening at an outside edge of the insulating substrate such that, when viewed along a thickness direction of the insulating substrate, the isolation region completely overlaps the first channel.

13 Claims, 4 Drawing Sheets

(51) Int. Cl.
*H01F 27/24* (2006.01)
*H02M 3/28* (2006.01)
*H02M 3/338* (2006.01)
*H02M 3/335* (2006.01)

(52) U.S. Cl.
CPC ..... *H01F 27/2804* (2013.01); *H01F 27/2895* (2013.01); *H01F 2027/065* (2013.01); *H01F 2027/2809* (2013.01); *H01F 2027/2819* (2013.01); *H02M 3/28* (2013.01); *H02M 3/335* (2013.01); *H02M 3/3384* (2013.01)

(58) Field of Classification Search
USPC .................................................. 336/65, 200
See application file for complete search history.

(56) References Cited

U.S. PATENT DOCUMENTS

| | | | | |
|---|---|---|---|---|
| 5,837,155 | A * | 11/1998 | Inagaki | B32B 15/20 216/18 |
| 7,116,557 | B1 * | 10/2006 | Raby | H05K 1/021 361/720 |
| 7,205,705 | B2 * | 4/2007 | Iwamoto | H03H 9/059 310/340 |
| 7,920,042 | B2 * | 4/2011 | Lotfi | H01F 17/0006 336/200 |
| 7,986,023 | B2 * | 7/2011 | Tews | H01L 23/5388 257/528 |
| 8,258,910 | B2 * | 9/2012 | Herhold | H01F 27/2804 336/200 |
| 8,964,410 | B2 * | 2/2015 | Chang | H05K 1/181 361/836 |
| 9,113,570 | B2 * | 8/2015 | Li | H05K 1/165 |
| 2002/0070833 | A1 * | 6/2002 | Junjie | H01F 27/325 336/198 |
| 2005/0212640 | A1 * | 9/2005 | Chiang | H01F 27/2804 336/200 |
| 2007/0152795 | A1 * | 7/2007 | Zeng | H01F 27/2804 336/212 |
| 2008/0186119 | A1 * | 8/2008 | Zou | H01F 27/02 336/92 |
| 2009/0072388 | A1 * | 3/2009 | Tews | H01L 23/5388 257/724 |
| 2011/0108317 | A1 | 5/2011 | Harrison et al. | |
| 2011/0193672 | A1 * | 8/2011 | Yang | H01F 27/2804 336/233 |
| 2012/0146755 | A1 * | 6/2012 | Shao | H01F 17/062 336/182 |
| 2012/0286588 | A1 * | 11/2012 | Steeneken | H01H 59/0009 307/115 |
| 2014/0116758 | A1 | 5/2014 | Li et al. | |
| 2014/0266549 | A1 * | 9/2014 | Huang | H01F 27/2804 336/200 |
| 2015/0035638 | A1 * | 2/2015 | Stephanou | H01F 27/24 336/200 |
| 2015/0101854 | A1 * | 4/2015 | Lee | H01F 27/2804 174/260 |
| 2015/0107883 | A1 | 4/2015 | Huang et al. | |
| 2016/0254088 | A1 * | 9/2016 | Kneller | H01F 27/40 361/268 |

OTHER PUBLICATIONS

Official Communication issued in corresponding Patent Application No. GB1607433.8, dated Aug. 22, 2016.
Parish et al., "Embedded Magnetic Component Device", U.S. Appl. No. 14/825,327, filed Aug. 13, 2015.
Kneller et al., "Embedded Magnetic Component Device", U.S. Appl. No. 14/825,332, filed Aug. 13, 2015.
Francis, "Embedded Magnetic Component Device", U.S. Appl. No. 14/883,854, filed Oct. 15, 2015.
Wang et al., "Embedded Magnetic Component Transformer Device", U.S. Appl. No. 14/883,855, filed Oct. 15, 2015.
Kneller, "Embedded Magnetic Component Transformer Device", U.S. Appl. No. 14/883,859, filed Oct. 15, 2015.
Kneller, "Embedded Magnetic Component Transformer Device", U.S. Appl. No. 14/883,863, filed Oct. 15, 2015.
Wang et al., "Embedded Magnetic Component Transformer Device", U.S. Appl. No. 14/883,866, filed Oct. 15, 2015.
Kneller et al., "Embedded Magnetic Component Transformer", U.S. Appl. No. 15/019,240, filed Feb. 9, 2016.
Parish et al., "Embedded Magnetic Component Device", U.S. Appl. No. 15/054,412, filed Feb. 26, 2016.
Lloyd, "Embedded Magnetic Component", U.S. Appl. No. 15/049,414, filed Feb. 22, 2016.
Harber, "Embedded Magnetic Component Device", U.S. Appl. No. 15/050,536, filed Feb. 23, 2016.
Kneller et al., "Multi-Tap Winding Design for Embedded Transformer", U.S. Appl. No. 15/498,765, filed Apr. 27, 2017.

* cited by examiner

POWER ELECTRONICS DEVICE WITH IMPROVED ISOLATION PERFORMANCE

BACKGROUND OF THE INVENTION

1. Field of the Invention

The present invention relates to a power electronics device including an embedded transformer device. More specifically, the present invention relates to a method and apparatus that significantly improve the isolation performance of printed circuit board embedded magnetics from a cavity vent to a magnetic core.

2. Description of the Related Art

Power supply devices typically use transformers as a portion of converter circuits. The transformers, which usually require bulky electrical windings and magnetic cores, often contribute the most to the weight and size of the power supply device, making miniaturization and cost reduction difficult. Further, the isolation requirements of the transformer device may limit the minimum footprint of the device before the risk of electrical arcing becomes unacceptably high.

A known embedded transformer device is shown in FIG. 1. The device includes an insulating substrate 100, into which a cavity 102 is formed between an outer periphery 102a and an inner periphery 102b. A toroidal magnetic core 104, having outer edge 104a and inner edge 104b, is inserted into the cavity 102. A first set of electrical windings 111 and a second set of electrical windings 121 are wound around the magnetic core 104. The windings include conductive vias passing through the insulating substrate 100, and conductive traces linking the conductive vias together into a coil arrangement. The conductive traces are shown in FIG. 1.

A printed circuit board (not shown in FIG. 1) is provided on a top surface of the insulating substrate 100. Electrical components are mounted on the printed circuit board within a first region 150 and a second region 152. The electrical components in the first region 150 form a portion of the circuitry connected to the first electrical winding 111, and the electrical components in the second region 152 form a portion of the circuitry connected to the second electrical winding 121. In one example, the first electrical winding is a primary winding of the transformer, and the second electrical winding is a secondary winding of the transformer. To significantly reduce or prevent malfunctioning of the transformer and to ensure safe and reliable operation, the first and second electrical windings must be electrically isolated from each another, and the electrical components and circuitry in the first region 150 must be electrically isolated from the electrical components and circuitry in the second region 152.

Two channels or vents 103-1 and 103-2 are provided in the insulating substrate 100. The channels 103, defined by channel walls 103a, join the cavity 102 to the outside of the insulating substrate 100 and allow air to circulate within the embedded transformer. Channel openings 105 are provided in the insulating substrate 100 to link the channels 103 to the outside of the device.

There are at least two distinct electrical paths from the first region 150 to the second region 152. The first electrical path is indicated by the arrow 154, and is the distance from the first region 150 to the second region 150 over the surface of the printed circuit board. To ensure the two regions 150, 152 are electrically isolated from one another along the first electrical path, the distance 154 must be sufficiently large to prevent electrical arcing through air.

The second electrical path extends from the first region 150 via the channel opening 105 and the channel 103-1 to the magnetic core 104. This portion of the path is indicated by the arrow A. The path continues through the magnetic core 104, which is an electrical conductor, to the opposite channel 103-2. The path then passes along arrow B, through the opposite channel 103, and opposite channel opening 105, until it reaches the second region 152.

To ensure the two regions 150, 152 are electrically isolated from one another along the second electrical path, the distances A and B must be sufficiently large to prevent electrical arcing, through air and through the channels 103, between the magnetic core 104 and the first or second regions 150, 152.

Thus, there is a need to provide an embedded transformer device with improved isolation performance, and methods for providing the embedded transformer device.

SUMMARY OF THE INVENTION

Preferred embodiments of the present invention provide a power electronics device with a significantly reduced size and significantly reduced footprint, while also providing isolation between the input and output sides of the device that is within predetermined safety limits.

According to a preferred embodiment of the present invention, a power electronics device includes an insulating substrate with a cavity included in the insulating substrate, a first channel included in the insulating substrate, and a second channel included in the insulating substrate, the first channel and the second channel each being connected to the cavity; a single magnetic core located in the cavity; one or more electrical windings passing through the insulating substrate and wound around the magnetic core; primary side electrical components located on a first region of a principal surface of the insulating substrate; secondary side electrical components located on a second region of the principal surface of the insulating substrate; and an isolation region located on the principal surface of the insulating substrate between the first region and the second region, for electrically isolating the first region from the second region, wherein a minimum isolation distance is provided between the first region and the second region. The first channel extends from the cavity to a first channel opening at an outside edge of the insulating substrate, and when viewed along a thickness direction of the insulating substrate the isolation region completely overlaps the first channel. The second channel extends from the cavity to a second channel opening at an outside edge of the insulating substrate, and, when viewed along a thickness direction of the insulating substrate, the isolation region completely overlaps the second channel. The first channel extends from the cavity to an outside edge of the insulating substrate in a direction parallel or substantially parallel to an edge of the isolation region and perpendicular or substantially perpendicular to the outside edge of the insulating substrate. The second channel extends from the cavity to the second channel opening in a direction parallel or substantially parallel to the direction in which the first channel extends from the cavity to the first channel opening. The insulating substrate is rectangular or substantially rectangular with shorter sides located along a lengthwise direction of opposing edges of the insulating substrate and longer sides located along a widthwise direction between the first region of the principal surface of the insulating substrate and the second region of the principal surface of the insulating substrate, the widthwise direction being perpendicular or substantially perpendicular to the lengthwise direction. The first channel extends in a direction parallel or substantially parallel to the lengthwise direction, and the first channel opening is located at one of the longer sides of the insulating substrate. The second channel extends in a direction parallel or substantially parallel to the lengthwise direction, and the second channel opening is located at another of the longer sides of the insulating substrate. The minimum isolation distance is equal or substantially equal to the sum of: a shortest distance, defined as C, from the first region to the first channel opening; a distance along, defined as D, a first channel wall from the first channel opening to the magnetic core; a distance, defined as E, along a second channel wall from the magnetic core to the first channel opening; and a shortest distance, defined as F, from the first channel opening to the second region. The distance C is greater than the distance D, and the distance F is greater than the distance E.

The shortest distance from the first region to the first channel opening may be the shortest distance from one of the primary side electrical components to the first channel opening, for example. The shortest distance from the first channel opening to the second region may be a shortest distance from the first channel opening to one of the secondary side electrical components, for example.

The minimum isolation distance may be equal or substantially equal to a shortest distance between the first region and the second region via the magnetic core, for example.

An isolation barrier may be formed on at least a portion of the principal surface of the insulating substrate, for example. The isolation region may overlap at least a portion of the isolation barrier when viewed along a thickness direction of the insulating substrate, for example.

An insulating layer may be formed on at least a portion of the principal surface of the insulating substrate, for example. The insulating layer may cover at least a portion of the magnetic core and at least a portion of the cavity when viewed along a thickness direction of the insulating substrate, for example.

The one or more electrical windings may extend through the insulating layer, and a further insulating layer may be provided on the one or more electrical windings, for example.

The one or more electrical windings may include primary electrical windings wound around a first section of the magnetic core; and secondary electrical windings wound around a second section of the magnetic core, the second section not overlapping the first section, for example. The first channel may be located between the primary electrical windings and the secondary electrical windings, for example.

The second channel may be located between the primary electrical windings and the secondary electrical windings, for example.

The isolation region may include a rectangular or substantially rectangular shape, extending along the lengthwise direction and the widthwise direction.

The device may further include a circuit board mounted on the principal surface of the insulating substrate, for example.

The minimum isolation distance may be equal or substantially equal to about 5 mm, for example.

According to a preferred embodiment of the present invention, corresponding methods for manufacturing the above power electronics device are provided.

Preferred embodiments of the present invention provide a power electronics device with a significantly reduced size and, in particular, a significantly reduced footprint. The device includes channels that connect the cavity to the outside of the device, while ensuring that electrical isolation distances between the input and output sides of the device, particularly along paths defining the channels, are maintained within safety limits. Further, the channels being completely overlapped by the isolation region provides a more even distribution of electrical windings. This provides a more balanced transformer, with significantly improved electronic and magnetic properties.

The above and other features, elements, steps, configurations, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will now be described in detail with reference to FIGS. 2 to 4. Note that the following description is in all aspects illustrative and not restrictive and should not be construed to restrict the applications or uses of the present invention in any manner.

Figure 2:
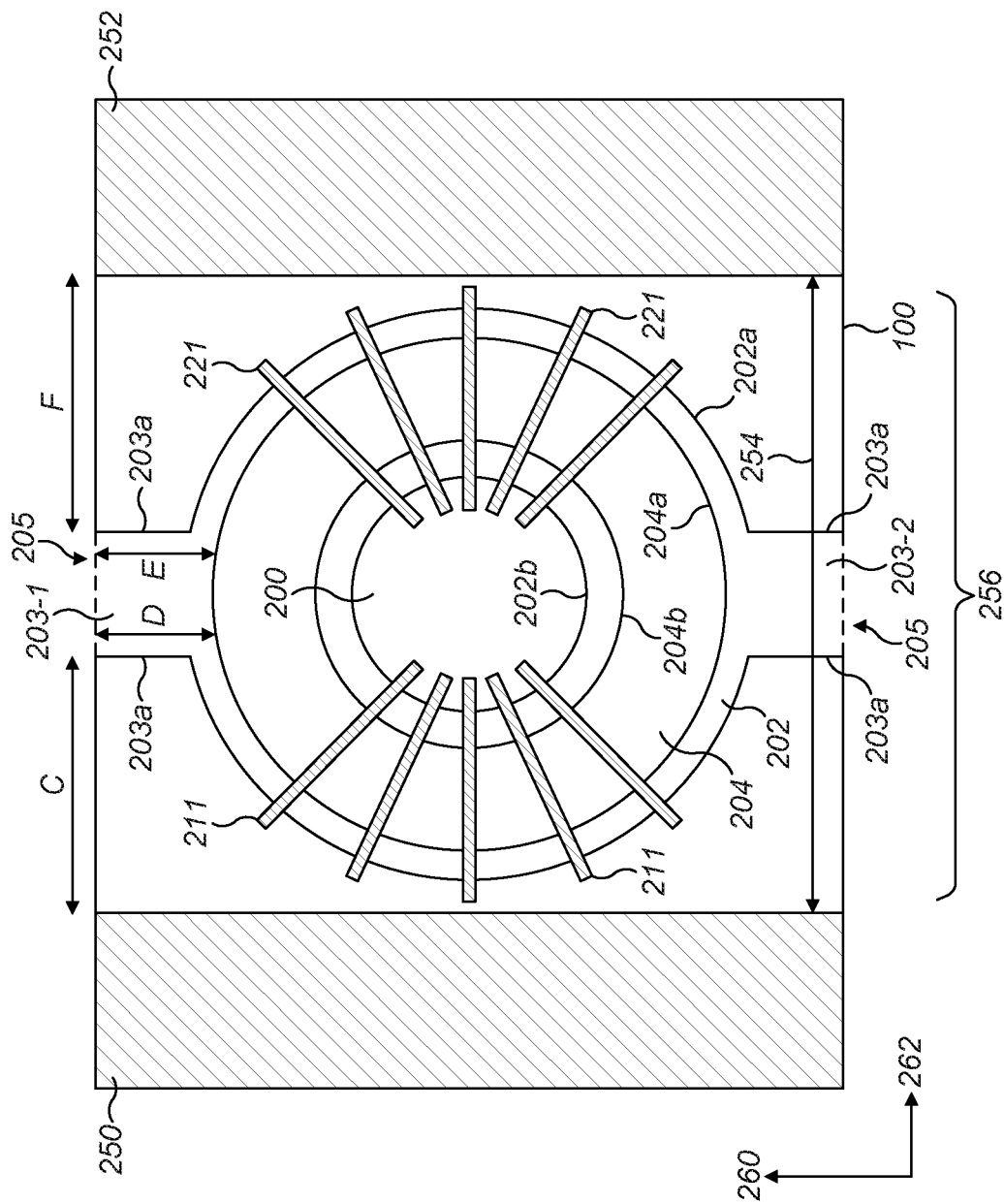
FIG. 2 is a schematic diagram of an embedded transformer device according to a preferred embodiment of the present invention.

FIG. 2 is a plan schematic view of an embedded transformer device according to a preferred embodiment of the present invention. Techniques for manufacturing an embedded magnetic component transformer device are described in UK patent applications GB1414469.5 and GB1414468.7 filed by the present applicant, which are incorporated herein by reference in their entireties.

As shown in FIG. 2, the embedded transformer device includes an insulating substrate 200 into which a cavity 202 and one or more channels 203 are formed. The view in FIG. 2 is directed along the thickness direction of the insulating substrate 200. The insulating substrate 200 is preferably formed of a resin material, for example, FR4. FR4 is a composite 'pre-preg' material that includes woven fiberglass cloth impregnated with an epoxy resin binder. The resin is pre-dried but not hardened, and thus the resin flows and acts as an adhesive for the fiberglass material when heated. FR4 has been found to have desirable thermal and insulation properties.

The cavity 202 is formed by removing material from a block of insulating substrate 200, for example, to form a toroidal or substantially toroidal shape as shown in FIG. 2. The cavity 202 is therefore defined between outer periphery 202a and inner periphery 202b.

A magnetic core 204 is inserted into the cavity 202. In the preferred embodiment shown in FIG. 2, the magnetic core 204 is toroidal or substantially toroidal and includes an outer edge 204a and an inner edge 204b. The cavity 202 includes a shape that fits closely around the edges of the magnetic core 204.

One or more channels 203 are formed between cavity edges 203a in the insulating substrate 200 and connect the cavity 202 to the outside of the insulating substrate 200. The channels 203 and cavity 202 are preferably formed, for example, by a milling process, in which the first channel 203-1 is removed by the milling drill bit, followed by the cavity 202, followed by the second channel 203-2. Depending on the dimensions of the magnetic core 204, for example, it may be preferable that the width of the channels 203 match or substantially match the width of the cavity 202 for ease of manufacturing. In other preferred embodiments of the present invention, for example the channels 203 and cavity 202 may have different widths. The channels 203 terminate at the outside of the insulating substrate 200 at channel openings 205. When the cavity 202 and channels 203 have been formed, a cover layer is provided on top of the cavity 202 and channels 203. The cover layer may be formed of the same or similar material to that of the insulating substrate 200, and may be solidly bonded to the insulating substrate 200, for example. The cover layer seals the magnetic core 204 within the cavity 202, and effectively becomes a portion of the insulating substrate 200 by providing the insulating substrate 200 with an upper surface. As described herein, the term 'top surface' of the insulating substrate 200 refers to this upper surface of the cover layer. Note that the cover layer is not shown in FIG. 2 to provide a clearer illustration of the features of the magnetic core 204.

The channels or vents 203 allow air to circulate within the cavity 202, to significantly reduce or prevent overheating of the cavity 202 and the magnetic core 204. The channels 203 also enable air to escape from the cavity 202, for example, during an SMA reflow soldering process. In an SMA reflow soldering process, heat is applied to the device, which causes any air trapped within the cavity 202 to expand. The channels 203 provide a path for the expanding air to escape without damaging the emedded transformer device.

The embedded transformer device includes a first electrical winding 211 and a second electrical winding 221. Additional electrical windings, for example, one or more auxiliary windings, may also be provided, although these are omitted from FIG. 2 for the sake of clarity. According to a preferred embodiment of the present invention, the first electrical winding 211 is the primary (input side) winding of the transformer, and the second electrical winding 221 is the second (output side) winding of the transformer. According to another preferred embodiment of the present invention, the first electrical winding 211 is the secondary transformer winding, and the second electrical winding 221 is the primary transformer winding. In a further preferred embodiment of the present invention, for example, when the embedded transformer is included as a portion of the converter circuit shown in FIG. 4 (described further below), the voltage(s) across the auxiliary winding(s) is (are) fed back to the input circuitry that energizes the first winding 211, with the auxiliary winding acting as a feedback winding. Alternatively or additionally, the auxiliary winding(s) are able to control other aspect(s) of the input and/or output circuitry. Other implementations of the auxiliary winding(s) include, for example, providing a housekeeping supply or controlling a synchronous rectifier. Other applications of the auxiliary winding(s) are also possible. Furthermore, it is not always necessary to include an auxiliary winding, for example, if a synchronous rectifier is provided on the output side of the transformer and the input side is controlled independently.

The first electrical winding 211 and the second electrical winding 221, together with the one or more auxiliary electrical windings (if included), are wound around the magnetic core 204, which is a common magnetic transformer core. The first electrical winding 211 and the second electrical winding 221 are separate from each other and are wound around non-overlapping areas of the magnetic core 204.

The first electrical winding 211, the second electrical winding 221, and the auxiliary electrical windings of the transformer are formed from upper and lower conductive traces positioned on respective top and bottom surfaces of the insulating substrate 200, and electrically connected by a plurality of respective conductive vias passing through the insulating substrate 200 from the top surface of the insulating substrate 200 to the bottom surface of the insulating substrate 200. In FIG. 2, the upper conductive traces are visible. At the ends of the upper conductive traces, the conductive vias (not shown in FIG. 2) extend through the insulating substrate 200 in a thickness direction of the insulating substrate 200, to electrically connect to the lower conductive traces (also not shown in FIG. 2). Accordingly, a complete coil arrangement is formed for the first electrical winding 211 and the second electrical winding 221 (and, if provided, for the one or more auxiliary electrical windings). Since the conductive vias extend through the insulating substrate 200, and since the upper and lower traces are disposed on the top and bottom surfaces of the insulating substrate 200, the conductive vias and traces are electrically insulated from the magnetic core 204.

The first electrical winding 211 preferably includes, for example, the same number of inner and outer conductive vias forming the complete first electrical winding, to provide that the terminals at either end of the first electrical winding 211 on the same surface of the insulating substrate 200 (for example, both of the terminals located on the top surface of the insulating substrate 200, or both of the terminals located on the bottom surface of the insulating substrate 200). Alternatively, for example, the first electrical winding 211 may be provided with an arrangement with one more inner conductive via than outer conductive vias, or with one fewer inner conductive vias than outer conductive vias. According to this alternative arrangement, the terminals at either end of the first electrical winding 211 are located on opposing surfaces of the insulating substrate 200. Both of these alternatives, where the end terminals are on the same or opposing sides, may be desirable depending on the location of the input and output circuitry to which the terminals are to be electrically connected, for example. The second electrical winding 221 and/or auxiliary winding(s) may also be arranged similar to the first electrical winding 211, for example.

When the transformer device is in operation, a ratio of the voltages provided across the first electrical winding 211 and the second electrical winding 221 is proportional to the number of turns in each respective winding. Therefore, the number of turns in each winding is able to be chosen, for example, by adding or removing conductive vias and conductive traces, to obtain desired voltage ratios between the windings. This is particularly desirable in, for example, isolated DC-to-DC converters, which often have strict requirements with respect to the output voltage.

An isolation barrier may be provided, for example, on the top and/or bottom surface of the insulating substrate 200 to provide electrical isolation between the upper (lower) conductive traces of the first electrical winding 211 and the upper (lower) conductive traces of the second electrical winding 221.

The transformer device, when included as a component in a power electronics device, for example, a power converter, is electrically connected to electrical circuitry that controls the first electrical winding 211 and the second electrical winding 221. In some cases, input-side circuitry is electrically connected to the first electrical winding 211, and output-side circuitry is electrically connected to the second electrical winding 221. The components forming the circuitry are preferably mounted, for example, to a printed circuit board (PCB) which is attached to the top surface of the insulating substrate 200. Although the PCB is not shown in FIG. 2, the positions of the electrical components are schematically indicated within a first region 250 and a second region 252. The electrical components in the first region 250 form a portion of the circuitry electrically connected to the first electrical winding 211, and the electrical components in the second region 252 form a portion of the circuitry electrically connected to the second electrical winding 221. In the preferred embodiment described above where the first electrical winding 211 is the primary (input side) winding, the circuitry within first region 250 may provide an energizing AC current to the first electrical winding 211, and the circuits within the second region 252 may process the AC current induced in secondary (output side) electrical winding 221, for example.

If the transformer is to operate safely and while significantly reducing or preventing the occurrence of malfunctions, the first electrical winding 211 and the circuitry within the first region 250 are electrically isolated from the second electrical winding 221 and the circuitry within the second region 252. The electrical isolation distances are determined with respect to the magnetic core 204, since the magnetic core 204 is typically an electrical conductor, and an electrical path from the first region 250 or first electrical winding 211 to the second region 252 or second electrical winding 221 is able to include the magnetic core 204.

The first electrical winding 211 is electrically isolated from the second electrical winding 221 because both sets of windings are enclosed within the insulating substrate 200, and/or protected by an isolation barrier or cover layer. In contrast, the electrical components in the first region 250 and the electrical components in the second region 252 are only separated from one another by air, for example, along a path with a width indicated by arrow 254 that crosses the top surface of the device. Preferably, for example, the electrical components in the first region 250 and the electrical components in the second region 252 are not protected from one another by a portion of the insulating substrate 200, an isolation barrier, or the like.

Accordingly, an isolation region 256 is provided between the first region 250 and the second region 252 across the top surface of the device. According to a preferred embodiment of the present invention, the first region 250 and second region 252 are provided on opposite sides of the top surface of the device, and include rectangular or substantially rectangular shapes. Both the first region 250 and the second region 252 extend along a lengthwise direction 260 and along a widthwise direction 262, as indicated by the hatched areas in FIG. 2. The lengthwise direction 260 is perpendicular or substantially perpendicular to the lengthwise region 262. The lengthwise 260 and widthwise 262 directions may be parallel or substantially parallel to the edges of the insulating substrate 200, for example. In the preferred embodiment shown in FIG. 2, the width 254 of the isolation region 256 (that is, the size of the isolation region 256 in the widthwise direction 262) is constant or substantially constant along the lengthwise direction 260 of the device. Therefore, the isolation region 256 includes a rectangular or substantially rectangular shape. Preferably, this arrangement provides at least a distance 254 between the electrical components in the first region 250 and the electrical components in the second region 252 along the lengthwise direction 260 of the device. The distance 254 is selected to provide a predetermined amount of isolation between the first region 250 and the second region 252, to significantly reduce or prevent electrical arcing between the electrical components in the first region 250 and the electrical components in the second region 252 through air along the top surface of the device. Since the transformer device is able to transform between a variety of different voltages, a minimum value selected for the distance 254 to significantly reduce or prevent electrical arcing varies according to the type of application in which the device is included. In one example, if the transformer device handles mains reinforced voltages of about 250 V rms, a minimum isolation distance of about 5 mm is provided for the width 254 of the isolation region 256 to comply with the insulator requirements of the standard EN/UL60950.

The channels 203 are included beneath only the isolation region 256. In other words, the isolation region 256 completely overlaps each of the channels 203 when the device is viewed along the thickness direction of the insulating substrate. In one example, the thickness direction is perpendicular or substantially perpendicular to both the lengthwise direction 260 and the widthwise direction 262, as indicated by the arrow 264 in FIG. 3.

Returning to FIG. 2, it is noted that, in addition to the direct electrical path 254 between the first region 250 and the second region 252, an indirect electrical path via the magnetic core 204 is included between the first region 250 and the second region 252. In one example, this indirect electrical path begins at the first region 250, extends along the outer edge of the insulating substrate 200 along arrow C, enters the channel 203-1 via channel opening 205, and extends along a first edge 203a of the channel 203 along arrow D to the conducting magnetic core 204. The indirect electrical path continues through the conducting magnetic core 204 to the opposite channel wall 203a, and then extends along arrow E back to the channel opening 205 before continuing along the outer edge of the insulating substrate 200 along arrow F and finishing at the second region 252. A similar indirect electrical path is able to also be made via the channel 203-2, although this similar indirect electrical path is not shown in FIG. 2.

Depending on the specific geometry of the device, the combined indirect electrical path distance C+D+E+F may be less than or equal to the direct electrical path distance 254, for example. In order to provide safe operation and significantly reduce or prevent electrical arcing, both the direct and indirect distances are set to be greater than a minimum safe value. As explained above, the minimum safe distance to significantly reduce or prevent electrical arcing varies according to the type of application in which the device is included. In the example where the transformer device handles mains reinforced voltages of about 250 V rms, a minimum isolation distance of about 5 mm is provided for the combined distance C+D+E+F to comply with the insulator requirements of the standard EN/UL60950.

The embedded transformer according to the preferred embodiments of the present invention, as shown, for example, in FIG. 2, provides several features as discussed below.

First, the positioning of the channels 203 to be completely overlapped by the isolation region 256 provides a smaller device that is able to be constructed without significantly reducing the isolation distances. In both the arrangement shown in FIG. 1 (prior art) and the arrangement shown in FIG. 2, the same or a similar minimum direct isolation distance, respectively depicted by arrows 154 and 254, is included to electrically isolate the electrical components of the first region 150, 250 from the electrical components of the second region 152, 252. In the prior art arrangement shown in FIG. 1, relatively long channels 103 need to be provided to ensure that the indirect isolation distance A+B also conforms to the minimum safe isolation distance required to prevent electrical arcing. Thus, in the prior art arrangement shown in FIG. 1, if a minimum indirect isolation distance of L is required between the first 150 and second 152 regions, then the design of the device is constrained by the limitation of L=A+B. Accordingly, the lengths A, B of each of the channels 103 is about L/2 in the prior art arrangement shown in FIG. 1. However, in the preferred embodiment of the present invention shown in FIG. 2, much shorter channels 203 are able to be included while still providing the minimum indirect isolation distance L. In the preferred embodiment of the present invention shown in FIG. 2, a design constraint of L=C+D+E+F is provided. Thus, according to the preferred embodiment of the present invention shown in FIG. 2, the lengths D, E of each of the channels 203 is about (L−C−F)/2, which is significantly shorter than the lengths of the channels 103 of the prior art arrangement shown in FIG. 1. The regions 250 and 252 of the preferred embodiment of the present invention shown in FIG. 2 are able to be made shorter in a widthwise direction 262, thereby providing a significant reduction in the width of the device as a whole. Therefore, a device according to the preferred embodiment of the present invention shown in FIG. 2 is able to include a significantly reduced footprint when compared with the prior art arrangement shown in FIG. 1.

Figure 1:
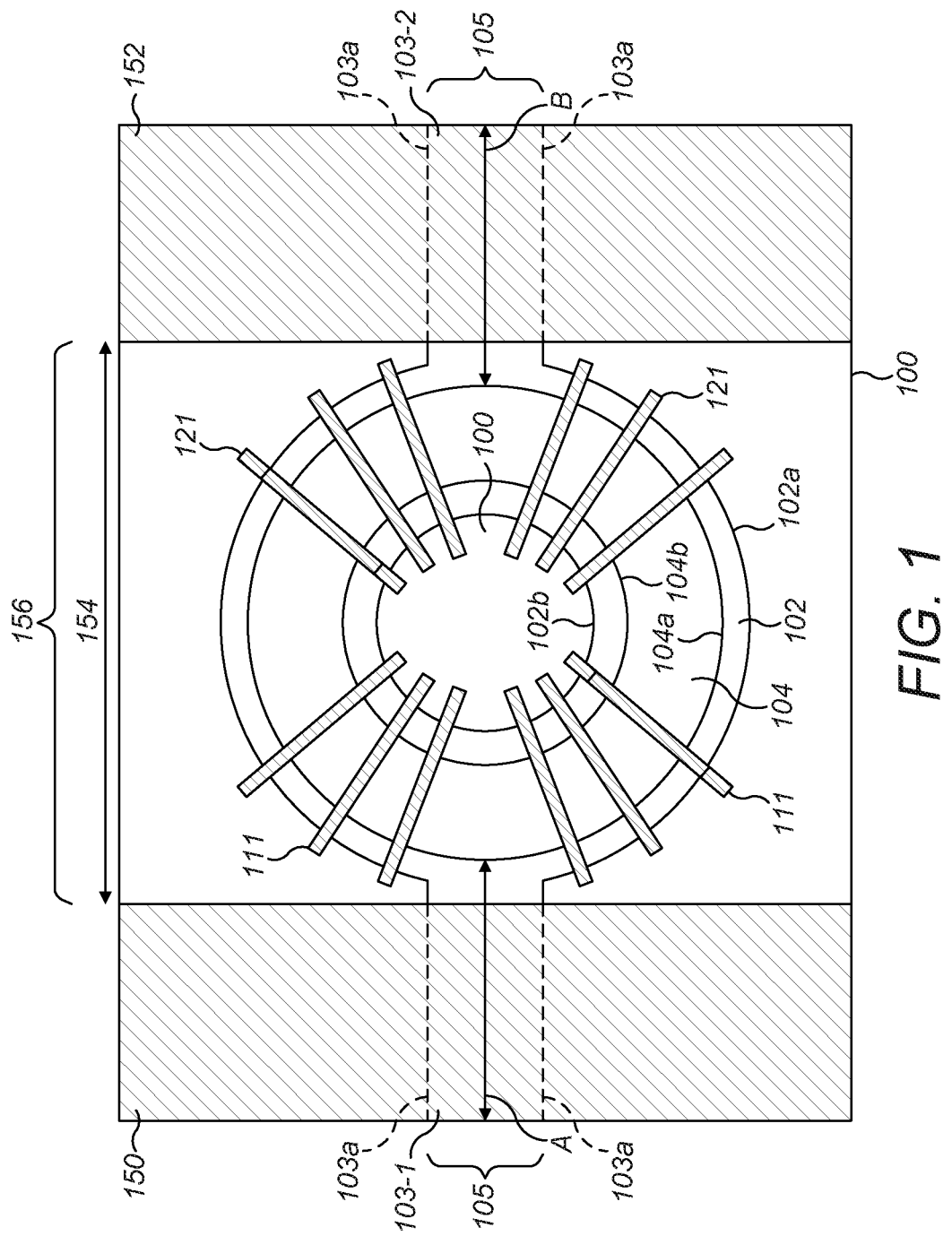
FIG. 1 is a schematic diagram of a prior art embedded transformer device.

Second, the positioning of the channels 203 to be completely overlapped by the isolation region 256 provides a more even distribution of electrical windings in the preferred embodiments of the present invention shown in FIG. 2 than in the prior art arrangement of FIG. 1. As shown in FIG. 1, the channels 103 of the prior art arrangement extend in a widthwise direction and interrupt the first 111 and second 121 electrical windings. Consequently, in the prior art arrangement of FIG. 1, the first electrical windings 111 are separated into two groups: one group above the channel 103-1 and another group below the channel 103-1. Similarly, the second electrical windings 121 of the prior art arrangement are also separated into two groups: one group above the channel 103-2 and another group below the channel 103-2. In the prior art arrangement shown in FIG. 1, the turns of each winding are not able to be evenly positioned around the magnetic core 104. Accordingly, in the prior art arrangement shown in FIG. 1, each turn of the transformer device is not able to be easily balanced, which adversely affects the electronic and magnetic properties of the transformer. However, in the preferred embodiment of the present invention shown in FIG. 2, the channels 203 do not constrain the winding arrangement, and the first electrical winding 211 and the second electrical winding 221 are able to be evenly distributed around the magnetic core 204 with an equal or substantially equal distance between each turn of the windings 211 and 221. Thus, according to the preferred embodiment of the present invention shown in FIG. 2, a balanced or substantially balanced transformer with significantly improved electronic and magnetic properties is able to be provided. It is noted that the significantly improved electronic and magnetic properties are able to be provided even in the case where an air core transformer device is included.

The specific angles of the channels relative to the lengthwise 260 or widthwise 262 directions are able to vary between preferred embodiments of the present invention. For example, the channels 203 may extend parallel or substantially parallel to the lengthwise direction 260, or in a direction perpendicular or substantially perpendicular to the edge of the insulating substrate 200 in which the channel opening 205 is formed. Although two channels 203 are shown in FIG. 2, only a single channel 203 may be provided, for example, according to a preferred embodiment of the present invention. In a further preferred embodiment of the present invention, more than two channels 203 may be provided, for example, with each of the more than two channels 203 joining the cavity 202 to the outside of the insulating substrate 200. If two or more channels 203 are provided, it is not necessary that the isolation region 256 completely overlaps each of the channels 203, for example, if the isolation region 256 overlaps at least one of the channels 203. In a preferred embodiment of the present invention, the isolation region 256 overlaps two of the channels 203, and the two channels 203 are parallel or substantially parallel to each other, for example.

Figure 3:
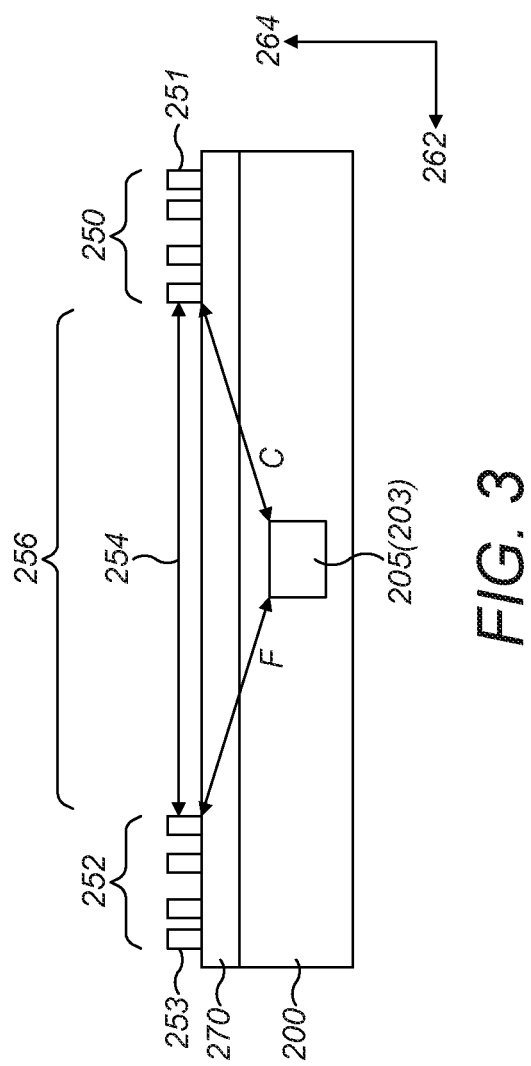
FIG. 3 is a schematic side elevation view of the embedded transformer shown in FIG. 2.

FIG. 3 shows a side schematic view of the embedded transformer device shown in plan view in FIG. 2. On the top surface of the insulating substrate 200 a printed circuit board (PCB) 270 is provided. The PCB includes electrical components 251 located in the first region 250 of the PCB 270 and electrical components 253 located in the second region 252 of the PCB 270. The widthwise direction 262 and thickness direction 264 of the insulating substrate 200 are indicated by arrows in FIG. 3. The view in FIG. 3 is shown along the lengthwise direction 260.

The magnetic core 204 and electrical windings 211, 221 are not visible in FIG. 3, since they are enclosed within the insulating substrate 200. An insulating cover layer and/or isolation barrier may be provided between the insulating substrate 200 and the PCB 270. In a preferred embodiment of the present invention, this insulating cover layer and/or isolation barrier electrically isolates the first electrical winding 211 and the second electrical winding 221 from each other and from the PCB 270, and prevents the first electrical winding 211 and the second electrical winding 221 from contacting the lower surface of the PCB 270, for example. According to another preferred embodiment of the present invention, the PCB 270 is not provided and the electrical components are mounted directly to the insulating substrate 200 or insulating cover layer.

The isolation region 256 is located between the first region 250 and the second region 252, as shown in FIG. 3. The direct electrical isolation distance 254 is also indicated in FIG. 3, located between the first 250 and second 252 regions along the surface of the PCB 270 in the widthwise direction 262. The opening 205 of the channel 203 is visible in the insulating substrate 200 in FIG. 3. The distances C and F, discussed above with respect to FIG. 2, are also shown in FIG. 3. In one example, the distance C is the shortest distance through air along the edge of the insulating substrate 200 and PCB 270 between an electrical component 251 of the first region 250 and the channel opening 205. Correspondingly, the distance F is the shortest distance through air between an electrical component 253 of the second region 252 and the channel opening 205. The distances C and F need not be parallel or substantially parallel to the widthwise direction 262, may extend at some angle to this direction to define a diagonal path, for example. In another example, the distances C and F are the shortest distances through air along the edge of the insulating substrate 200 and PCB 270 between the channel opening 205 and electrical conductors in respective first 250 and second 252 regions. The electrical conductors may be, for example, conducting traces printed onto the PCB 270 or onto the insulating substrate 200, and electrically connected to respective electrical components 251, 253.

As shown in FIG. 3, the channel opening 205 is centrally or substantially centrally located within the isolation region 256 along the widthwise direction 262. In another preferred embodiment of the present invention, the channel opening 205 is provided off-center in the widthwise direction 262. Further, FIG. 3 shows that the channel opening 205 is centrally or substantially centrally located within the insulating substrate 200 along the thickness direction 264. In another preferred embodiment of the present invention, the channel opening 205 is provided off-center in the widthwise direction 262.

An embedded transformer device according to a preferred embodiment of the present invention may be included as a portion of a switching power electronic device, for example, a self-oscillating push-pull (Royer) circuit, and may be included to convert a DC input voltage to a DC output voltage. This arrangement is discussed below with respect to relation to FIG. 4, to demonstrate a general application of the embedded transformer device to power electronics.

Figure 4:
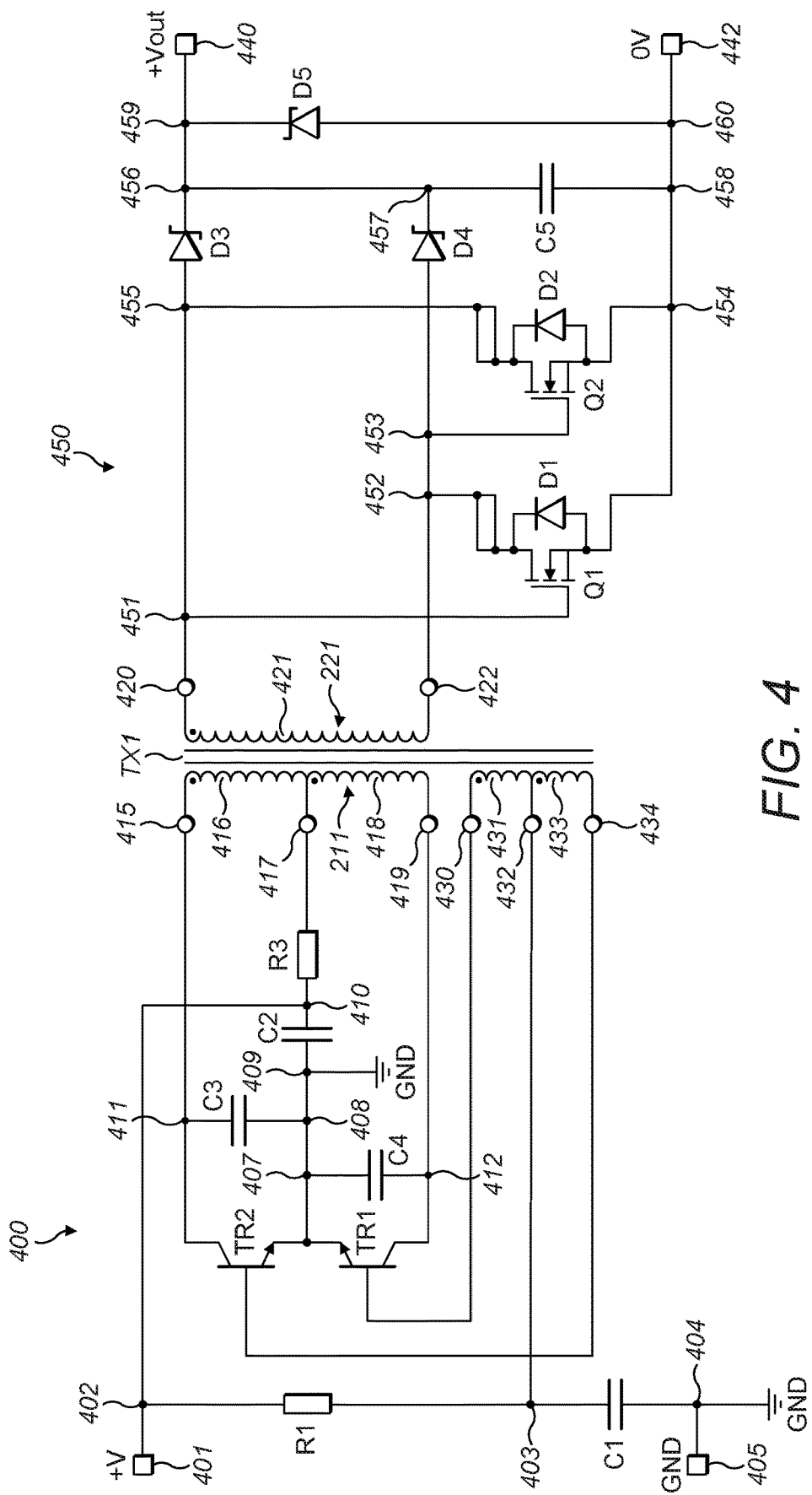
FIG. 4 is a circuit diagram showing the embedded transformer device included in a DC-to-DC converter.

FIG. 4 is a circuit diagram including the above-described embedded transformer device TX1, a Royer circuit 400 located on an input side of the transformer TX1, and a synchronized rectifier circuit 450 located on an output side of the transformer TX1.

Royer circuit 400 receives a DC input between a +V input terminal 401 and GND input terminal 405, with the GND terminal being connected to or provided with a ground potential. A resistor R1 and capacitor C1 are electrically connected in series across the input terminals 401, 405. Resistor R1 is electrically connected between nodes 402 and 403 and capacitor C1 is electrically connected between nodes 403 and 404. Node 402 is electrically connected to the +V input terminal 401 and node 404 is electrically connected to the GND input terminal 405.

The transformer TX1 is the above-described embedded transformer device and includes a first electrical winding 211 defined between nodes 415 and 419, a second electrical 221 winding defined between nodes 420 and 422, and an auxiliary winding defined between nodes 430 and 434. Node 417 is electrically connected along the first electrical winding, and node 432 is electrically connected along the auxiliary winding. Therefore, nodes 417 and 432 form tap terminals. In one example, the nodes 417 and 432 are each electrically connected to a midpoint of their respective windings to define center-tap terminals. Thus, the first electrical winding 211 is divided into two winding portions 416 and 418, and the auxiliary winding is divided into two auxiliary winding portions 431 and 433. The second electrical winding 221 is provided as a single winding portion 421.

Two transistors TR1 and TR2 are provided to connected and disconnect an energizing voltage across the two portions of the first electrical windings 418 and 416, respectively. Although transistors TR1 and TR2 are shown as NPN type transistors, other types of transistors may be included. High power switching transistors, for example, MOSFETs (metal oxide field effect transistors) may be included as transistors TR1 and TR2.

The collector of transistor TR2 is electrically connected to a first end of the first electrical winding at node 415, and the collector of transistor TR1 is electrically connected to a second end of the first electrical winding at node 419. The emitter of transistor TR1 and the emitter of transistor TR2 are both electrically connected to node 406. Node 406 is electrically connected to nodes 407, 408, and 409, all of which are connected to or provided with a ground potential, indicated by GND in FIG. 4.

A first terminal of capacitor C2 is electrically connected to node 409, and a second terminal of capacitor C2 is electrically connected to node 410, which is electrically connected directly to the high voltage input +V at node 402. A resistor R3 is provided between node 410 and node 417. A capacitor C3 is provided between nodes 411 and 408, in parallel with transistor TR2, and a capacitor C4 is provided between nodes 407 and 412, in parallel with transistor TR1. Node 411 is electrically connected to the first end 415 of the first electrical winding and to the collector of transistor TR2, and node 412 is electrically connected to the second end 419 of the first electrical winding and to the collector of transistor TR1.

Each end of the auxiliary winding is electrically connected to one of the bases of the transistors TR1, TR2. Thus, node 430 is electrically connected to the base of transistor TR1, and node 434 is electrically connected to the base of transistor TR2. Intermediate node 432 is electrically connected the first terminal of a resistor R2, the second terminal of which is electrically connected to node 403.

The input side circuit 400 oscillates between energizing the winding portion 416 and energizing the winding portion 418. When winding portion 418 is energized, the increasing magnetic flux passing through the core of transformer TX1 induces a voltage across the auxiliary winding portions 431 and 433. The induced voltage across auxiliary winding portion 431 applies a voltage to the base terminal of transistor TR1 to keep transistor TR1 switched ON. A positive feedback arrangement is obtained, with TR1 being switched ON and TR2 being switched OFF. Eventually, the magnetic field within the transformer core saturates and the rate of change of magnetic flux within it drops to zero. The voltage across the first electrical winding portion 418, and therefore the current through it, also drops to zero. The auxiliary windings 431 and 433 react to this change, and an induced voltage, of a reverse polarity, is induced across the auxiliary windings 431 and 433. Thus, the transistor TR2 is switched ON and the transistor TR1 is switched OFF, thereby energizing the winding portion 416. Again, a positive feedback arrangement is obtained, and the voltage applied to the base of transistor TR2 by the auxiliary winding portion 433 maintains transistor TR2 in a switched ON state, while keeping transistor TR1 in a switched OFF state. Following this, the magnetic field within the core saturates and the circuit returns to energizing the winding portion 418. This oscillatory behavior, alternating between energizing the first electrical winding portions 418 and 416, continues indefinitely as long as input power is provided to the input terminals 401 and 405.

The output side of the transformer includes a synchronized rectifier circuit 450 with first and second transistors Q1 and Q2 electrically connected between first and second output terminals +Vout (element 440) and 0V (element 442). Although the two transistors Q1 and Q2 are shown as inductive channel MOSFETs in FIG. 4, suitable transistor types may be included. Diode D1 is electrically connected across transistor Q1, allowing current to flow from node 454 to node 452. Diode D2 is electrically connected across transistor Q2, allowing current to flow from node 454 to node 455.

On the output side of the transformer TX1, a second electrical winding 421 is provided between nodes 420 and 422. Node 420 electrically connects via nodes 451 and 455 to a forward biased diode D3, which is electrically connected via nodes 456 and 459 to the +Vout output terminal 440. In this case, the +Vout output terminal 440 is a positive output terminal. Further, node 422 electrically connects via nodes 452 and 453 to a forward biased diode D4, which is electrically connected via nodes 457, 456, and 459 to the +Vout output terminal 440. Although diodes D3 and D4 are shown in FIG. 4 as Schottky diodes, normal rectifier diodes may be included, for example.

Node 451, located in between node 420 and the input of the diode D3, electrically connects node 420 to the gate terminal of transistor Q1. Node 453, which is located in between node 422 and diode D4, electrically connects node 422 to the gate terminal of transistor Q2. The drain terminal of transistor Q1 is electrically connected to node 452, which is located in between the node 422 and diode D4. The drain terminal of transistor Q2 is electrically connected to node 455, which is located in between the node 420 and the diode D3. The source terminals of the transistors Q1 and Q2 are both electrically connected to node 454, which is electrically connected via nodes 458 and 460 to the 0V output terminal 442.

Capacitor C5 is electrically connected across the +Vout and 0V output terminals 440 and 442. A first terminal of capacitor C5 is electrically connected to node 457, located between the output of diode D4 and the +Vout output terminal 440, while a second terminal of capacitor C5 is electrically connected to node 458, located between the 0V output terminal 442 and the source terminals of transistors Q1 and Q2. Node 457 is electrically connected to node 456, which is located between diode D3 and the +Vout output terminal 440. Reverse-biased Zener diode D5 is also electrically connected across the output terminals, with a first terminal of diode D5 electrically connected to node 459 coupled to the +Vout output terminal 440, and a second terminal of diode D5 electrically connected to node 460 coupled to the 0V output terminal 442.

A voltage is induced across the second electrical winding 421 according to the rate of change of magnetic flux within the core of transformer TX1. An alternating current is therefore provided in the second electrical winding.

In a first mode of operation, the alternating current circulates in a first direction, though diode D3, which is forward biased, and via node 451 into the gate terminal of transistor Q1, turning transistor Q1 ON. When the transistor Q1 is ON, current flows through the transistor Q1 from source to drain, and current flows in the winding 421 from the second node 422 to the first node 420 and to the +Vout output terminal 440 via diode D3. A positive voltage is therefore provided between output terminals +Vout (element 440) and 0V (element 442). In the first mode of operation, reverse biased diode D4 significantly reduces or prevents current from flowing into the gate terminal of the second transistor Q2, which remains turned OFF.

In a second mode of operation, the alternating current circulates in a second direction, though diode D4, which is now forward biased, and via node 453 into the gate terminal of transistor Q2, turning transistor Q2 ON. When the transistor Q2 is ON, current flows through the transistor Q2 from source to drain, and current flows in the winding 421 from node 420 to node 422 and to the +Vout output terminal 440 via diode D4. A positive voltage is therefore also provided between output terminals +Vout (element 440) and 0V (element 442), similar to the first mode of operation.

As the magnetic flux in the transformer changes, the magnitude and direction of the alternating current in the output circuit changes. The diodes D3 and D4 rectify the alternating current, so that the output provided between output terminals 440 and 442 is a positive voltage signal.

The capacitor C5 smoothes the output voltage signal to provide a constant or substantially constant direct current between the output terminals 440 and 442. Diode D5 may also be electrically connected across the output terminals 440 and 442 to limit the gate voltage at the FETS Q1 and Q2 to a specific range, depending on the particular value of the diode D5. A resistance may be used in place of the diode D5 as a dummy load. The circuit shown in FIG. 4 defines an isolated DC-to-DC convertor, which takes a DC input across the +V and GND input terminals 401 and 405, and generates a DC output across the +Vout and 0V output terminals 440 and 442. As will be appreciated those skilled in the art, the voltage of the DC output relative to the voltage of the DC input is able to be adjusted by varying the number of turns on the first electrical winding 211 and second electrical winding 221. Although FIG. 4 shows that the embedded transformer device is included in a Royer circuit, preferred embodiments of the present invention may be applied to any power converter circuit topology that includes an embedded transformer.

Although conductive vias are described above in the preferred embodiments of the present invention, any conductive connecting element or component, for example, conductive pins, may be included in place of any one or more of the conductive vias. Furthermore, the first electrical winding 211 and the second electrical winding 221 are able to each either be primary transformer windings that are electrically connected to the input power supply of the transformer, or secondary transformer windings that are electrically connected to the output of the transformer. The embedded transformer device is able to be either a step-up or step-down transformer.

According to a preferred embodiment of the present invention, the above-described devices are mounted on a third party circuit board or motherboard. Accordingly, it may be preferable to select the positioning of electrical components and conductors on the third party circuit board, for example, to significantly reduce or prevent any effect on the minimum isolation distance described above.

Further, although in the above examples the magnetic core 204 and cavity 202 are shown as being circular or substantially circular in shape, they may include a different shape in other preferred embodiments of the present invention. Non-limiting examples include an oval, substantially oval, elongate toroidal, or substantially elongate toroidal shape; a toroidal or substantially toroidal shape including a gap; EE, EI, I, EFD, EP, UI or UR core shapes; and the like. The magnetic core 204 may be coated with an insulating material to significantly reduce or prevent the occurrence of breakdown between the conductive magnetic core and the conductive vias or metallic traces. The magnetic core may also include chamfered edges to provide a profile or cross-section that is rounded.

Various modifications to the preferred embodiments of the present invention described above are possible and will occur to those skilled in the art without departing from the scope of the invention which is defined by the following claims. In particular, it should be understood that features described in relation to a single embodiment of the present invention are able to be included in other embodiments. The scope of the present invention, therefore, is to be determined solely by the following claims.

What is claimed is:

1. A power electronics device comprising:
an insulating substrate including a cavity, a first channel, and a second channel, the first channel and the second channel each being connected to the cavity;
a single magnetic core located in the cavity;
one or more electrical windings passing through the insulating substrate and wound around the magnetic core;
primary side electrical components located on a first region of a principal surface of the insulating substrate;
secondary side electrical components located on a second region of the principal surface of the insulating substrate; and
an isolation region located on the principal surface of the insulating substrate between the first region and the second region that electrically isolates the first region from the second region, wherein a minimum isolation distance is provided between the first region and the second region; wherein
the first channel extends from the cavity to a first channel opening at an outside edge of the insulating substrate, and, when viewed along a thickness direction of the insulating substrate, the isolation region completely overlaps the first channel;
the second channel extends from the cavity to a second channel opening at the outside edge of the insulating substrate, and, when viewed along the thickness direction of the insulating substrate, the isolation region completely overlaps the second channel;
the first channel extends from the cavity to the outside edge of the insulating substrate in a direction parallel or substantially parallel to an edge of the isolation region and perpendicular or substantially perpendicular to the outside edge of the insulating substrate;
the second channel extends from the cavity to the second channel opening in a direction parallel or substantially parallel to a direction in which the first channel extends from the cavity to the first channel opening;
the insulating substrate is rectangular or substantially rectangular with shorter sides located along a lengthwise direction of opposing edges of the insulating substrate and longer sides located along a widthwise direction between the first region of the principal surface of the insulating substrate and the second region of the principal surface of the insulating substrate, the widthwise direction being perpendicular or substantially perpendicular to the lengthwise direction;
the first channel extends in a direction parallel or substantially parallel to the lengthwise direction, and the first channel opening is located at one of the longer sides of the insulating substrate;
the second channel extends in the direction parallel or substantially parallel to the lengthwise direction, and the second channel opening is located at another of the longer sides of the insulating substrate;
the minimum isolation distance is equal or substantially equal to the sum of:
distance C defined as a shortest distance from the first region to the first channel opening;
distance D defined as a distance along a first channel wall from the first channel opening to the magnetic core;
distance E defined as a distance along a second channel wall from the magnetic core to the first channel opening; and
distance F defined a shortest distance from the first channel opening to the second region; and
distance C is greater than distance D, and distance F is greater than distance E.

2. The device of claim 1, wherein:
distance C is a shortest distance from one of the primary side electrical components to the first channel opening; and
distance F is a shortest distance from the first channel opening to one of the secondary side electrical components.

3. The device of claim 1, wherein the minimum isolation distance is equal or substantially equal to a shortest distance between the first region and the second region via the magnetic core.

4. The device of claim 1, further comprising:
an isolation barrier formed on at least a portion of the principal surface of the insulating substrate; wherein
the isolation region overlaps at least a portion of the isolation barrier when viewed along the thickness direction of the insulating substrate.

5. The device of claim 1, further comprising:
an insulating layer formed on at least a portion of the principal surface of the insulating substrate; wherein
the insulating layer covers at least a portion of the magnetic core and at least a portion of the cavity when viewed along the thickness direction of the insulating substrate.

6. The device of claim 5, wherein:
the one or more electrical windings extend through the insulating layer; and
a further insulating layer is provided on the one or more electrical windings.

7. The device of claim 1, wherein:
the one or more electrical windings include:
primary electrical windings wound around a first section of the magnetic core; and
secondary electrical windings wound around a second section of the magnetic core, the second section not overlapping the first section; and
the first channel is located between the primary electrical windings and the secondary electrical windings.

8. The device of claim 1, wherein the second channel is located between primary electrical windings and secondary electrical windings.

9. The device of claim 1, wherein:
the isolation region includes a rectangular or substantially rectangular shape, extending along the lengthwise direction and the widthwise direction.

10. The device of claim 1, further comprising a circuit board mounted on the principal surface of the insulating substrate.

11. The device of claim 1, wherein the minimum isolation distance is equal or substantially equal to about 5 mm.

12. The device of claim 1, wherein the insulating substrate includes only two channels consisting of the first channel and the second channel.

13. The device of claim 1, wherein the one or more electrical windings is connected to the primary side electrical components and secondary side electrical components.

* * * * *